(12) United States Patent
Callaghan

(10) Patent No.: US 7,853,677 B2
(45) Date of Patent: Dec. 14, 2010

(54) TRANSPARENT BRIDGING AND ROUTING IN AN INDUSTRIAL AUTOMATION ENVIRONMENT

(75) Inventor: David M. Callaghan, Concord, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 527 days.

(21) Appl. No.: 11/224,206

(22) Filed: Sep. 12, 2005

(65) Prior Publication Data
US 2007/0061455 A1    Mar. 15, 2007

(51) Int. Cl.
*G06F 15/173* (2006.01)
*G06F 13/28* (2006.01)

(52) U.S. Cl. ............... 709/223; 709/224; 711/147
(58) Field of Classification Search ........... 709/202, 709/203, 213, 216, 223, 224, 250; 711/147
See application file for complete search history.

(56) References Cited

U.S. PATENT DOCUMENTS

| | | | |
|---|---|---|---|
| 4,271,505 A | 6/1981 | Menot et al. | |
| 5,131,092 A | 7/1992 | Sackman et al. | |
| 5,280,480 A | 1/1994 | Pitt et al. | |
| 5,307,463 A | 4/1994 | Hyatt et al. | |
| 6,061,603 A | 5/2000 | Papadopolus et al. | |
| 6,321,272 B1 * | 11/2001 | Swales ................. | 709/250 |
| 6,560,235 B1 | 5/2003 | Jones | |
| 6,717,382 B2 | 4/2004 | Graiger et al. | |
| 6,883,172 B1 | 4/2005 | Angeline et al. | |
| 2002/0156837 A1 | 10/2002 | Batke et al. | |
| 2003/0034998 A1 | 2/2003 | Kodosky et al. | |
| 2004/0111512 A1 | 6/2004 | Barth | |
| 2004/0204772 A1 | 10/2004 | Maturana et al. | |

OTHER PUBLICATIONS

International Search Report for PCT Application No. PCT/US06/34902, dated Jul. 3, 2008, 10 pgs.
Office Action mailed Oct. 23, 2009 for Chinese Application No. 200680038662.1, 14 pages.

* cited by examiner

*Primary Examiner*—Peling A Shaw
(74) *Attorney, Agent, or Firm*—Turocy & Watson LLP; R. Scott Speroff; John M. Miller

(57) ABSTRACT

The subject disclosure pertains to transparent communications in an industrial automation environment amongst automation system components. PLC modules can be provided with unique network addresses such as IP addresses and accessed over a network using those addresses. The actual protocol and route employed to communicate with the PLC modules need not be known to a client system in order to access the PLC modules. Industrial control system configurations can be modified and expanded without affecting the client system ability to function in the environment.

13 Claims, 17 Drawing Sheets

TRANSPARENT BRIDGING AND ROUTING IN AN INDUSTRIAL AUTOMATION ENVIRONMENT

TECHNICAL FIELD

The subject invention relates generally to industrial control systems and more particularly to a system and methodology for transparent communication in an industrial control system.

BACKGROUND

Industrial control systems have enabled modem factories to become partially or completely automated in many circumstances. These systems generally include a plurality of input and output (I/O) modules that interface at a device level to switches, contactors, relays and solenoids along with analog control to provide more complex functions such as proportional, integral and derivative (PID) control. Communications have also been integrated within the systems, whereby many industrial controllers can communicate via network technologies such as Ethernet, ControlNet, DeviceNet or other network protocols and also communicate to higher level computing systems. Generally, industrial controllers utilize the aforementioned technologies along with other technology to control, cooperate and communicate across multiple and diverse applications.

At the core of the industrial control system, is a logic processor such as a programmable logic controller (PLC). Programmable logic controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Industrial controllers and associated control systems have increasingly become more sophisticated and complicated as control applications have been distributed across the plant floor and in many cases across geographical or physical boundaries. As an example, multiple controllers and/or other devices may communicate and cooperate to control one or more aspects of an overall manufacturing process via a network, whereas other devices may be remotely located, yet still contribute to the same process. In other words, control applications have become less centrally located on a singular control system having associated responsibilities for an entire operation. Thus, distribution of the overall control function and/or process frequently occurs across many control components, systems or devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns industrial automation systems and the communications therein utilizing a communications network. This is achieved by assigning industrial control devices (e.g., PLCs, PLC I/O modules, PLC program modules, Human Machine Interfaces, sensors . . . ) an address operable on a network. The assigned address is utilized by clients to transparently access the industrial control device over the network. Furthermore, the assigned address can be employed by the industrial control device to transparently access remote clients and servers.

According to one aspect of the subject invention, requests are transmitted to a PLC via a network. The requests are translated into the communication protocol used by the PLC backplane and routed over the backplane to the recipient module. In addition, the subject innovation provides systems and methods to prevent unauthorized requests from being made to a PLC module over the network by devices lacking proper access privileges. Similarly, in another aspect the PLC hosted applications and industrial control devices can transparently bridge or across the PLC backplane and reach internet and intranet based resources including web servers, file servers, databases, application servers and other devices or applications.

In another aspect of the subject invention, an industrial control device is assigned multiple addresses, one address for each sub-component or service included in the device. The addresses can be discovered so that clients can retrieve a list of all available devices and services and the network addresses corresponding to the devices and services. Additionally or alternatively, the nodes can announce themselves.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
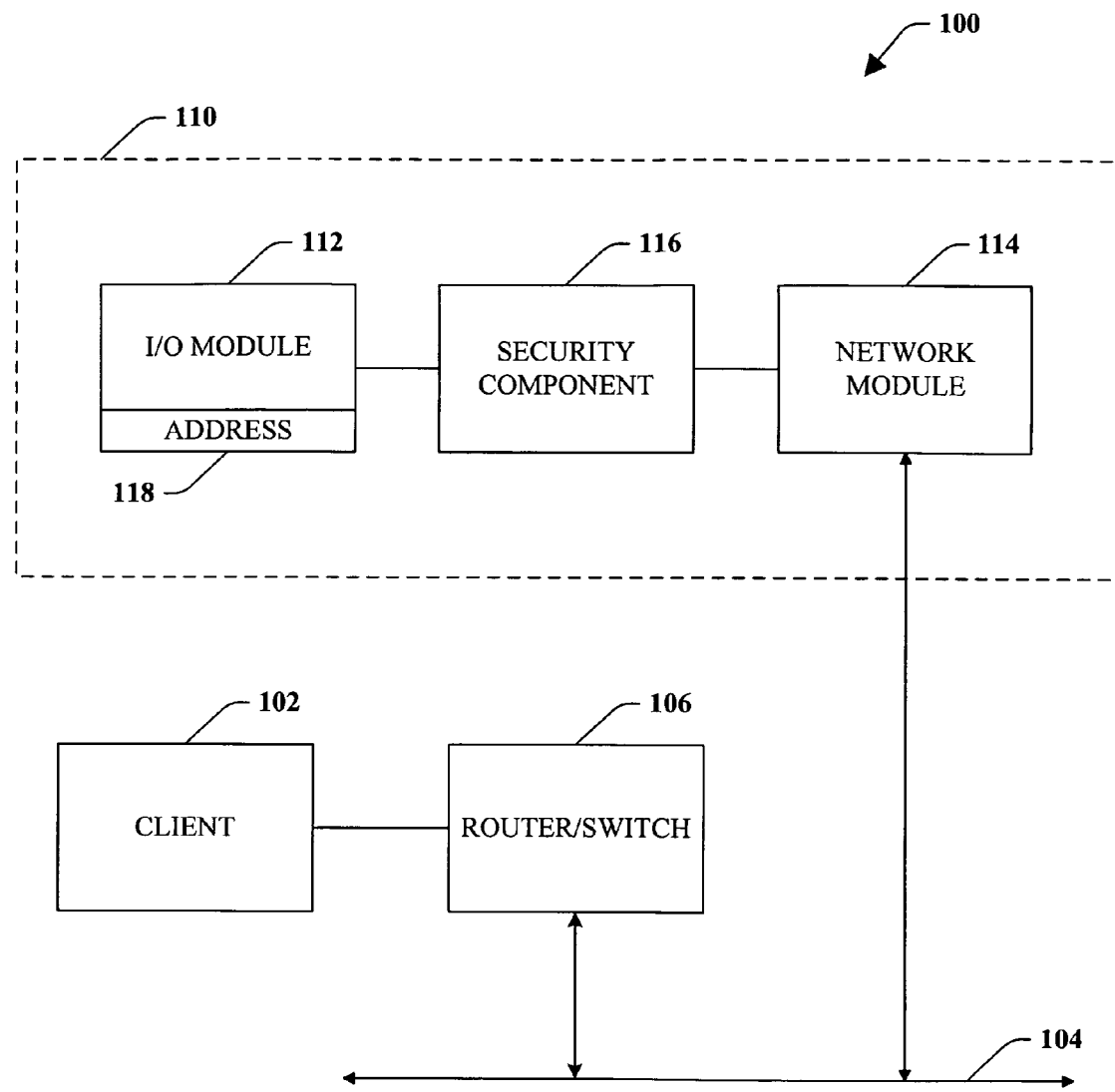
FIG. 1 is a block diagram of an industrial control system in accordance with an aspect of the subject invention.

Turning initially to FIG. 1, a schematic block diagram illustrates an industrial control system 100 that exemplifies communication according to one aspect of the subject invention. System 100 includes a client 102 and a programmable logic controller (PLC) 110. PLC 110 includes a network module 114 and an I/O module 112. I/O module 112 is assigned an address 118 so that module 112 can be accessed via a network 104. For example, the network 104 can be a TCP/IP network and address 118 can be an Internet Protocol version 4 (IPv4) address or an Internet Protocol version 6 (IPv6) address. It is to be appreciated that network 104 can be any type of communications network (e.g., wired, wireless, satellite . . . ) and address 116 can be any type of network address that is functional on the type of network employed.

PLC 110 is communicatively coupled to network 104 by network module 114. I/O module 112 is associated with network module 114 such that requests made to or from I/O module 112 received on network 104 are forwarded by network module 114. A security component 116 is associated with or contained by PLC 110 and controls access to I/O module 112 identified by unique address 118 (e.g., EP address). It is to be appreciated that, while security component 116 is depicted as a distinct object, it may also be contained within I/O module 112 or network module 114 or distributed there between. Security component 116 controls access to I/O module 114 by acting as a firewall, acting as a Network Address Translation (NAT) device, authenticating a username and password, blocking unauthorized requests, ingress or egress filter, encryption/decryption functionality, federated security, map one security access mechanism credential to a more common format "single sign on" method used throughout the enterprise, among other things.

Client 102 communicates on network 104 through a router/switch 106. It is to be appreciated that the client 102 may not require the router/switch 106 in order to communicate on network 104. The client 102 can be a personal computer (PC), a human machine interface (HMI), another PLC, or other network connectible component. Client 102 can communicate with I/O module 112 over network 104 by accessing or addressing address 118 associated with the I/O module 112. Security component 116 ensures that client 102 can only communicate with I/O module 112 if it is authorized to do so by providing valid credentials (including federated security, e.g. single sign on services) or being configured correctly on the network 104.

Figure 2:
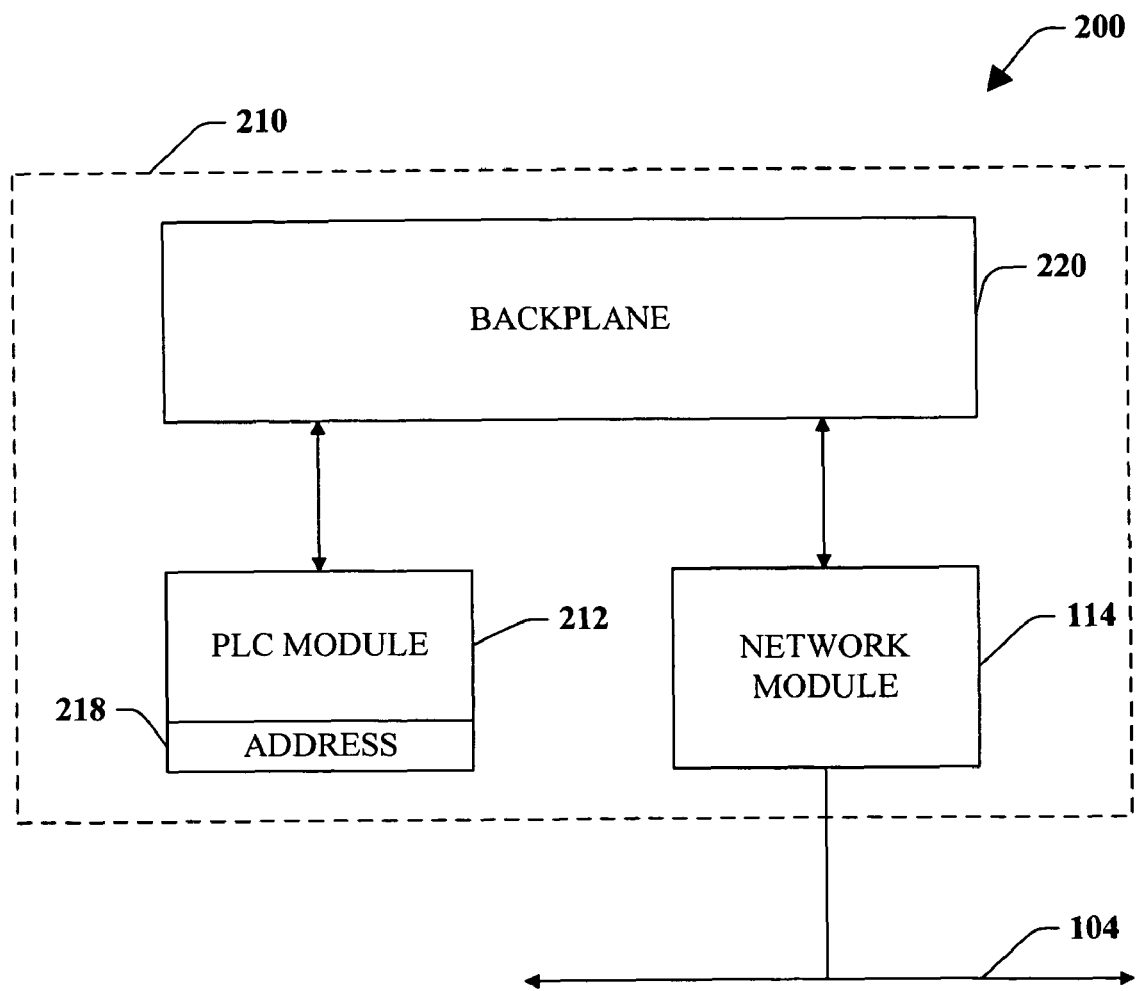
FIG. 2 is a block diagram illustrating a logic controller in accordance with an aspect of the subject invention.

Turning to FIG. 2, a schematic diagram depicting a programmable logic controller (PLC) system 200 in accordance with another aspect of the subject invention is shown. System 200 includes a PLC 210 and a network 104. A PLC module 212 and a network module 114 are operatively coupled to the PLC 210 by a PLC backplane 220. The PLC module 212 and network module 114 can communicate over the backplane 220 employing at least one of a plurality of protocols including but not limited to Industrial Protocol, Transparent Interprocess Communication and Internet Protocol. PLC module 212 is assigned one or more unique system address 218 such as an IP address so that module 212 can be accessed or otherwise interacted with via the network 104. Requests sent via the network 104 to the PLC module 212 at address 218 are routed over the backplane 220 by the network module 114 by translating the request from the protocol utilized by the network 104 to the protocol utilized by the backplane 220. Alternatively, it should be appreciated that the protocol employed by PLC 210 can be the same protocol as utilized over network 104. Accordingly, no translation may need to be done. Similarly, applications hosted by PLC module 212 can utilize network module 114 to translate the requests to the protocol utilized by network 104 and access remote resources including file servers, databases, application servers, web servers, and distributed applications.

Figure 3:
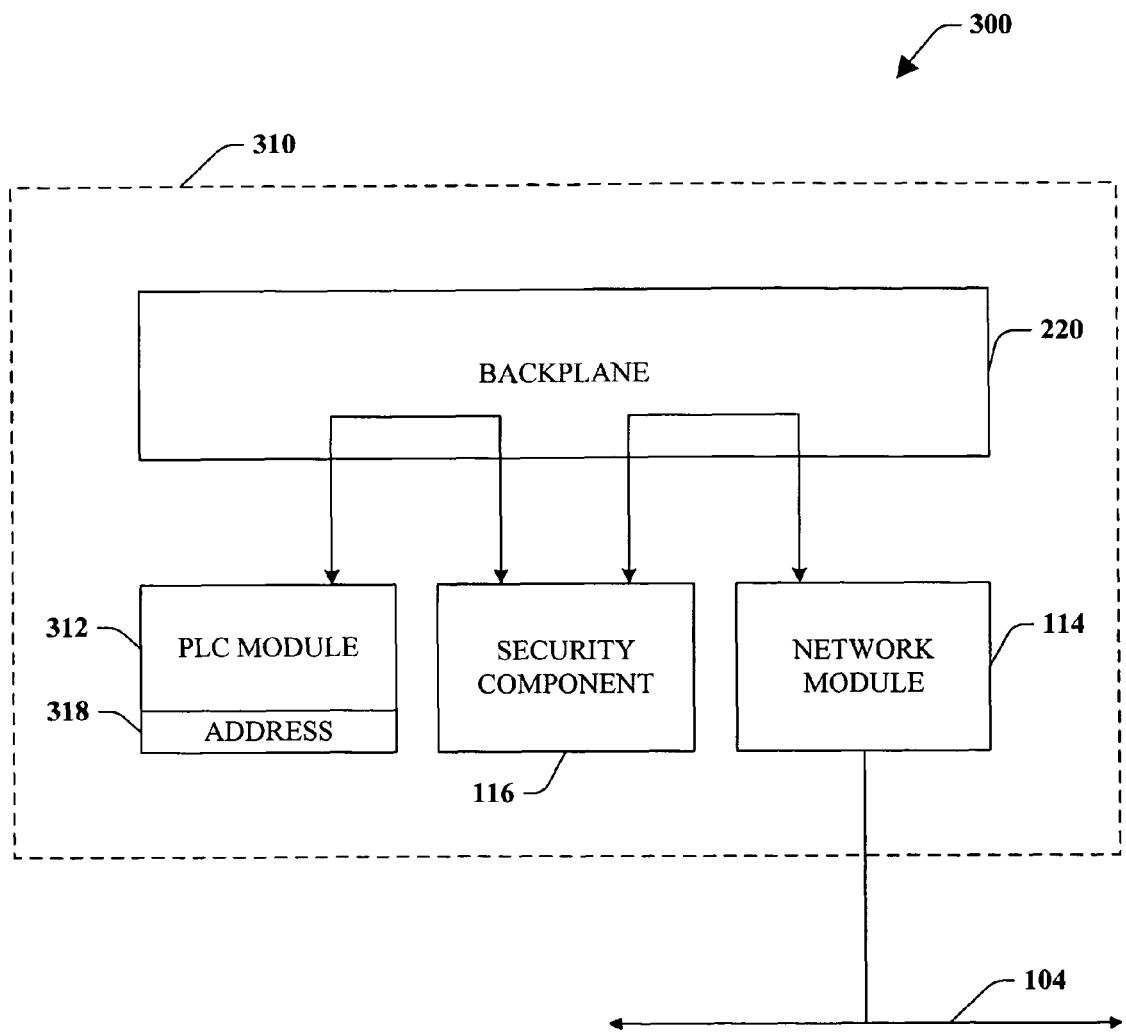
FIG. 3 is a block diagram illustrating a logic controller in accordance with an aspect of the subject invention.

In FIG. 3, a PLC system 300 similar to the system in FIG. 2 is depicted showing another aspect of the subject invention. A PLC 310 includes a network module 114, a PLC module 312 with associated network address 318, and a security component 116. The network module 114, the PLC module 312 and the security component 116 are communicatively coupled for instance by backplane 220. Further, the network module 114 is communicatively coupled to and can interact with data transmissions over network 104. In addition, the network module 114 can translate a network request made to the PLC module 312 at address 318 to a protocol utilized by the PLC 310 and transmitted by the backplane 220. Additionally or alternatively, the network module 114 can translate data provided in a PLC protocol to the protocol of the network 104. Such protocol may be the same or different then protocol employed and transmitted by network 104. Security component 116 acts as an intermediary between a PLC module 312 and network module 114 and can control the transmission and access to data provided by components of PLC 310. In particular, unauthorized routing over the backplane 220 can be prevented by the security component 116. For example, security component 116 may implement an authentication procedure that determines the identity of data transmitter and determines whether such transmitter is authorized to interact with PLC modules 312. As depicted security component 116 can be connected via the backplane, intercept and analyzed data or requests for data directed toward a PLC module. The security component 116 may be configured to monitor the intercepted data for example to verify data values within expected ranges and send alarm or event notifications to a supervisory agent when necessary. Alternatively, it should be noted that security component 116 can be provided within the network module 114 and/or PLC module 312. Furthermore, the security credentials utilized by component 116, such as user name and password or digital certificate (X.509, etc) may be contained in PLC module 312 and accessed by security component 116. Security component 116 may incorporate such security devices as smart cards, SIM chips etc and the actual security credentials may not actually move across backplane 220.

Figure 4:
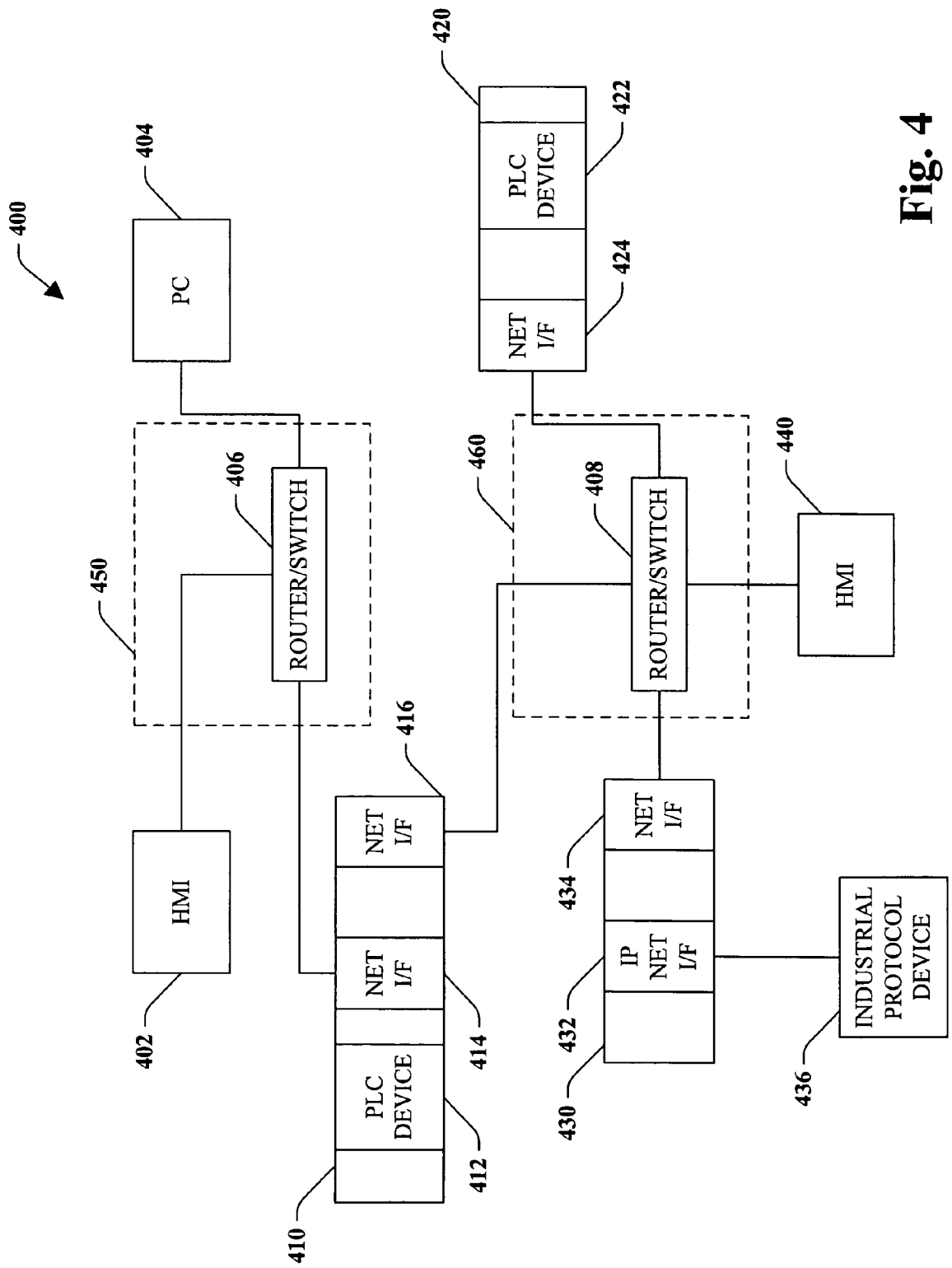
FIG. 4 is a block diagram illustrating an industrial control system in accordance with an aspect of the subject invention.

Turning now to FIG. 4, a schematic block diagram illustrates an exemplary industrial control system 400. System 400 includes a personal computer (PC) 404 and human machine interface (HMI) 402 that are connected to a first network 450 through router/switch 406. A second HMI 440 is connected to a second network 460 through a second router/switch 408. Programmable logic controllers (PLCs) 410, 420 and 430 are also connected to the second network 460 through router/switch 408 via network interfaces 416, 424, and 434 respectively. PLC 410 is further connected to the first network 450 through router/switch 406 via network interface module 414. PC 404 and HMI 402 can communicate with any devices on the second network 460 via PLC 410. Requests from PC 404 and HMI 402 addressed to any device on the second network 460 will be forwarded through the backplane of PLC 410 from network interface 414 communicatively coupled to the first network 450 to network interface 416 communicatively coupled to the second network 460. The response from any device on the second network 460 will be returned to PC 404 or HMI 402 in a similar fashion. The response will be forwarded from network interface 416 to network interface 414 through the backplane of PLC 410. Likewise, devices communicatively connected to network interface 416 may transparently send requests to PC 404 or HMI 402 through the same backplane routing managed by devices 414 and 416.

PLCs 410 and 420 include PLC devices or modules 412 and 422 respectively. For example, PLC devices 412 and 422 can be any type of PLC module (e.g. I/O, program, processor, etc.). PLC device 412 can transmit data to and receive data from network interfaces 414 and 416 over the backplane of PLC 410. Similarly, PLC device 422 can communicate with network interface 424 over the backplane of PLC 420. Data requests sent to PLC device 412 from HMI 402 and PC 404 on the first network 460 are forwarded to PLC device 412 by network interface 414 via the backplane. Requests sent from HMI 440 on the second network 460 to PLC 422 are routed over the backplane of PLC 420 by network interface 424. PC 404 and HMI 402 can send requests to PLC device 422 by forwarding the request from the first network 460 to the second network 460 through network interfaces 414 and 416.

PLC 430 includes an industrial protocol network interface 432 in addition to network interface 434. An industrial protocol device 436 is communicatively coupled to PLC 430 through the industrial protocol network interface 432. Data requests bound for industrial protocol device 436 from PC 404 and HMIs 402 and 440 is received by network interface 434. The request is forwarded over the backplane of PLC 430 to industrial protocol network interface 432 which then routes the request on the industrial protocol network to industrial protocol device 436. The response is returned on the industrial protocol network to industrial protocol network interface 432 where it is then forwarded over the backplane of PLC 430 to network interface 434. The response is transmitted on the second network 460 to data requestor or forwarded to the first network 450 via PLC 410.

Figure 5:
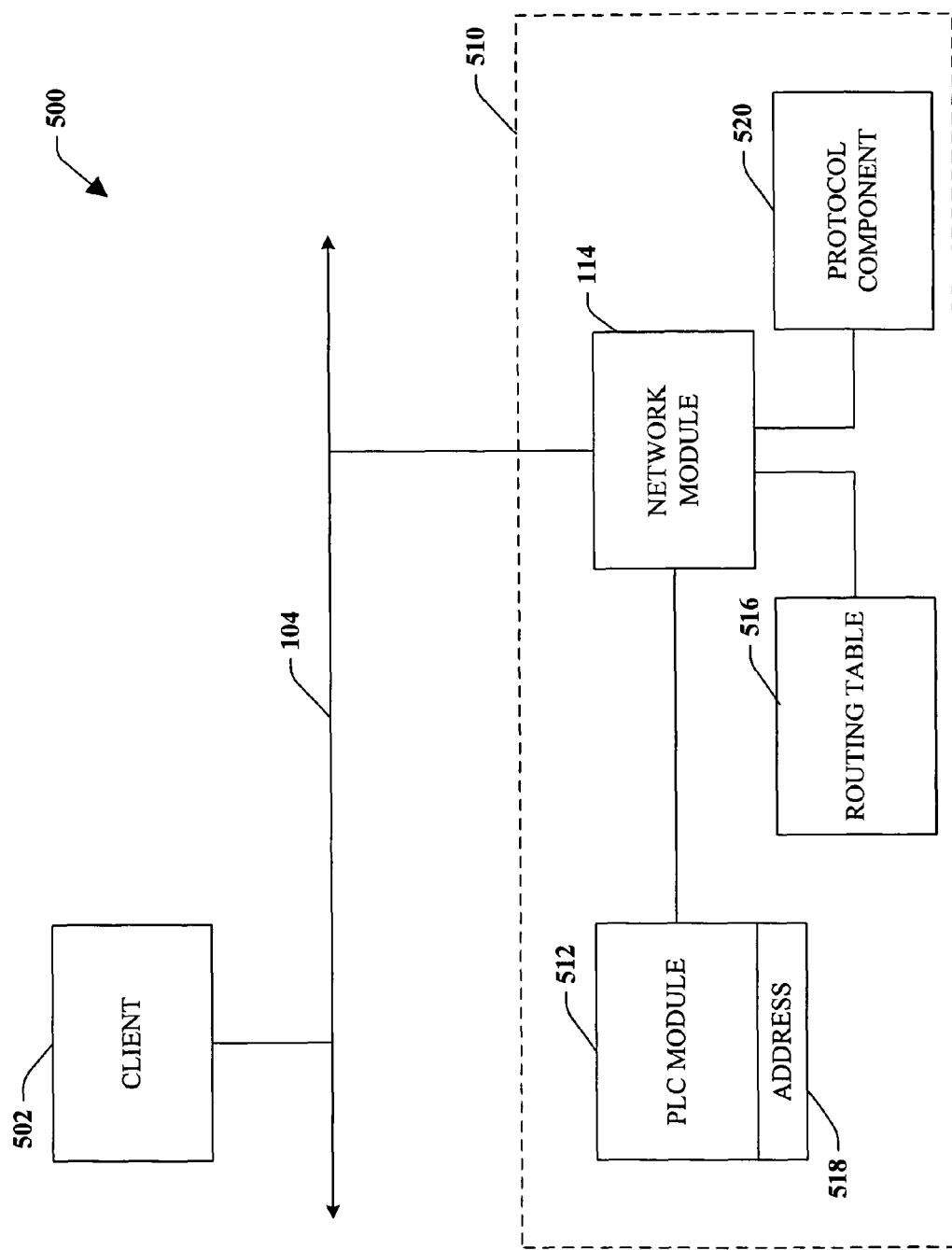
FIG. 5 is a block diagram illustrating a logic controller in accordance with an aspect of the subject invention.

Turning now to FIG. 5, a schematic block diagram illustrates an industrial control system 500 that exemplifies communication according to one aspect of the subject invention. System 500 includes a client 502 and a programmable logic controller (PLC) 510. PLC 510 includes a network module 114 and a PLC module 512. PLC module 512 can be any type of module (e.g. I/O, program, processor, etc.). An address 518 is assigned to PLC module 512 so that module 512 can be accessed via a network 104. The network 104, for example, can be a TCP/IP network and address 518 can be an Internet Protocol version 4 (IPv4) address or an Internet Protocol version 6 (IPv6) address. It is to be appreciated that network 104 can be any type of communications network (e.g., wired, wireless, satellite . . . ) and address 518 can be any type of network address that is functional on the type of network employed.

PLC 510 is communicatively coupled to network 104 by network module 114. PLC module 512 is associated with network module 114 such that requests made to or from module 512 received on network 104 are forwarded by network module 114. A routing table 516 is employed by network module 114 to facilitate forwarding the request received on network 104. The routing table 516 contains a mapping of address 518 operable on network 104 to an industrial protocol ID or address. When an incoming request is sent from client 502 on network 104 to address 518, intended for module 512, the request is received by network module 114. Network module 114 looks up address 518 in routing table 516 and retrieves an industrial protocol ID or address which is then used to route the request to module 512. Similarly, when a request from module 512 is received by network module 114, the network module 114 accesses the routing table 516 to retrieve the address 518 associated with module 512. The network module uses the retrieved address to forward the request from module 512 to client 502 on network 104 such that it appears the request originated from address 518. In addition to the routing table component 516, there is a protocol component 520 that performs protocol translations between the industrial protocols and the respective Internet standard protocol. For example, there is a standard ICMP "ping" used to detect the presence of an Ethernet device. This "ping" service may be intercepted by device 114, to lookup a routing address via component 516, and then translate to the appropriate industrial protocol via component 520 equivalent to message with device 512. All these lookups and transformations are not detectable by the remote client 502.

Figure 6:
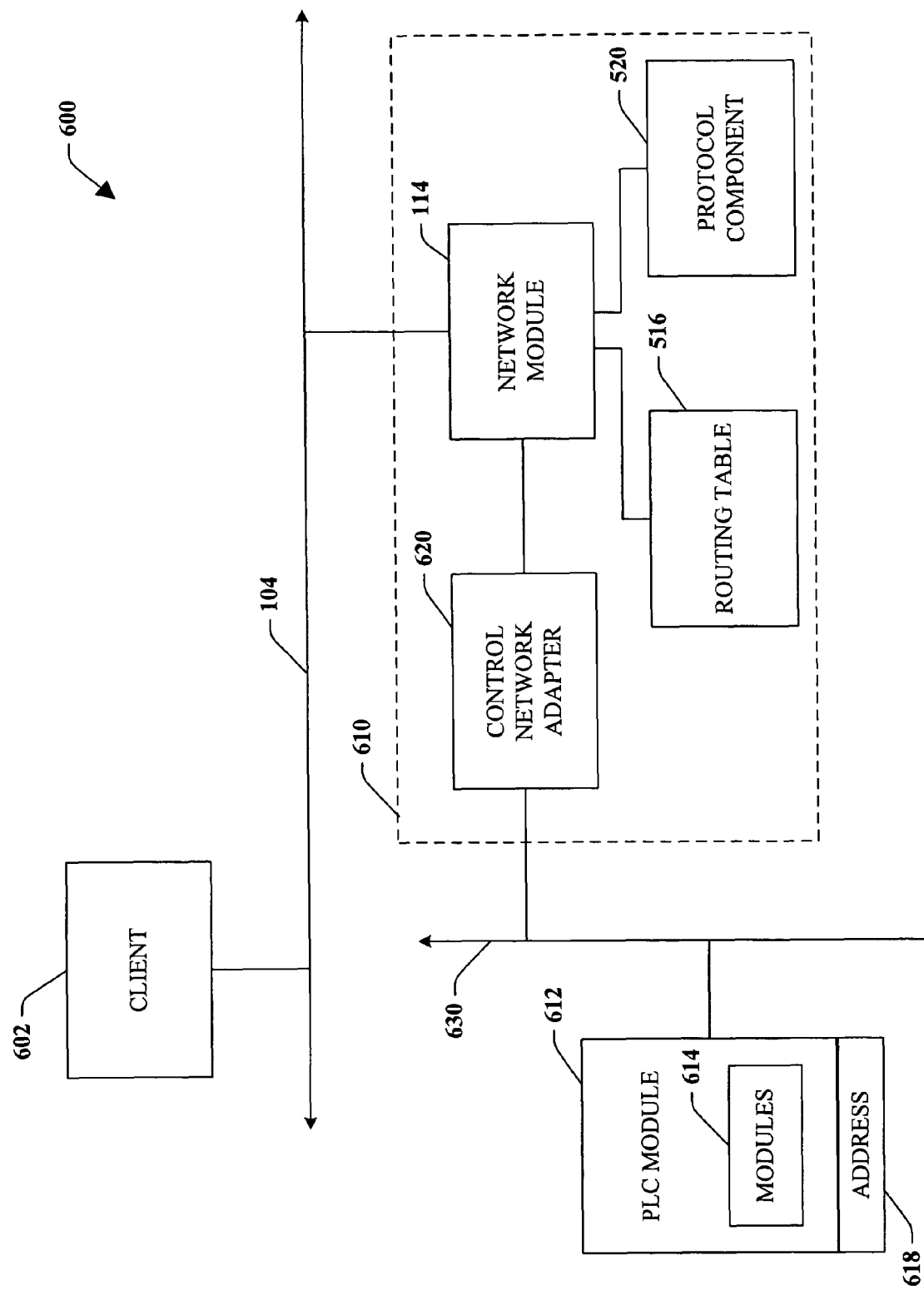
FIG. 6 is a block diagram illustrating a logic controller in accordance with an aspect of the subject invention.

FIG. 6 depicts an industrial control system 600 similar to the system in FIG. 5 showing another aspect of the subject invention. System 600 includes a client 602, a PLC 610, and a remote PLC module 612. PLC module 612 can be any type of module (e.g. I/O, program, processor, etc.). An address 618 is assigned to PLC module 612 so that module 612 can be accessed via a network 104. In addition, it should be noted that PLC module 612 can include or be associated with modules like those of PLC module 610 including but not limited to control adapter 620, network module 114, routing table 516, and protocol component 520, but not shown in the drawing for purpose of brevity. PLC 610 includes a network module 114 and a control network adapter 620. PLC module 612 is communicatively coupled to a control network 630 and PLC 610 is communicatively coupled to control network 630 through control network adapter 620. Similar to the system in FIG. 5, a routing table 516 is used to map address 618 into an address of module 612 on control network 630. When an incoming request for module 612 is received from network 104 by network module 114, the network module 114 uses the routing table 516 to retrieve the control network address mapped to address 618. Furthermore, protocol component 520 can perform protocol translations between the industrial protocols and the respective Internet standard protocol. The network module 114 forwards the request to the control network address on control network 630 through the control network adapter 620. Similarly, a request from module 612 is received by the network module 114 from the control network 630 through control network adapter 620. The network module 114 again uses the routing table 516 to map the control network address and protocol of module 612 to address 618 and protocol operable on network 104. The network module 114 then uses address 618 to transmit the request on network 104.

Figure 7:
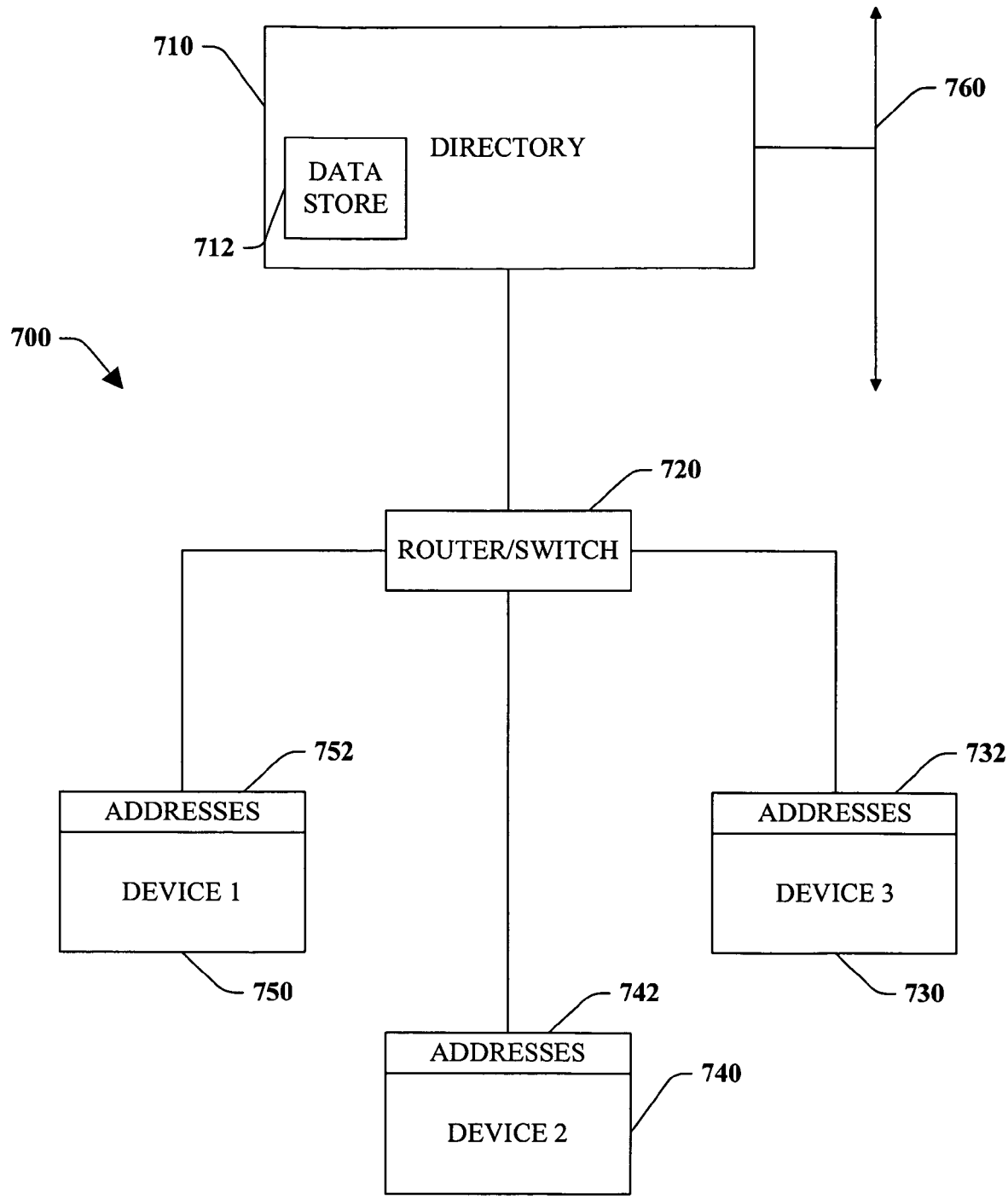
FIG. 7 is a block diagram illustrating a discovery system in accordance with an aspect of the subject invention.

Referring now to FIG. 7, an industrial control system 700 is depicted. Industrial control devices 730, 740, and 750 are communicatively coupled to directory component 710 through a router/switch 720. Each of the control devices 730, 740, and 750 are assigned one or more network addresses 732, 742, and 752 respectively. It is to be appreciated that control devices 730, 740, and 750 can be a PLC rack, a PLC module, a HMI, or the like.

Figure 8:
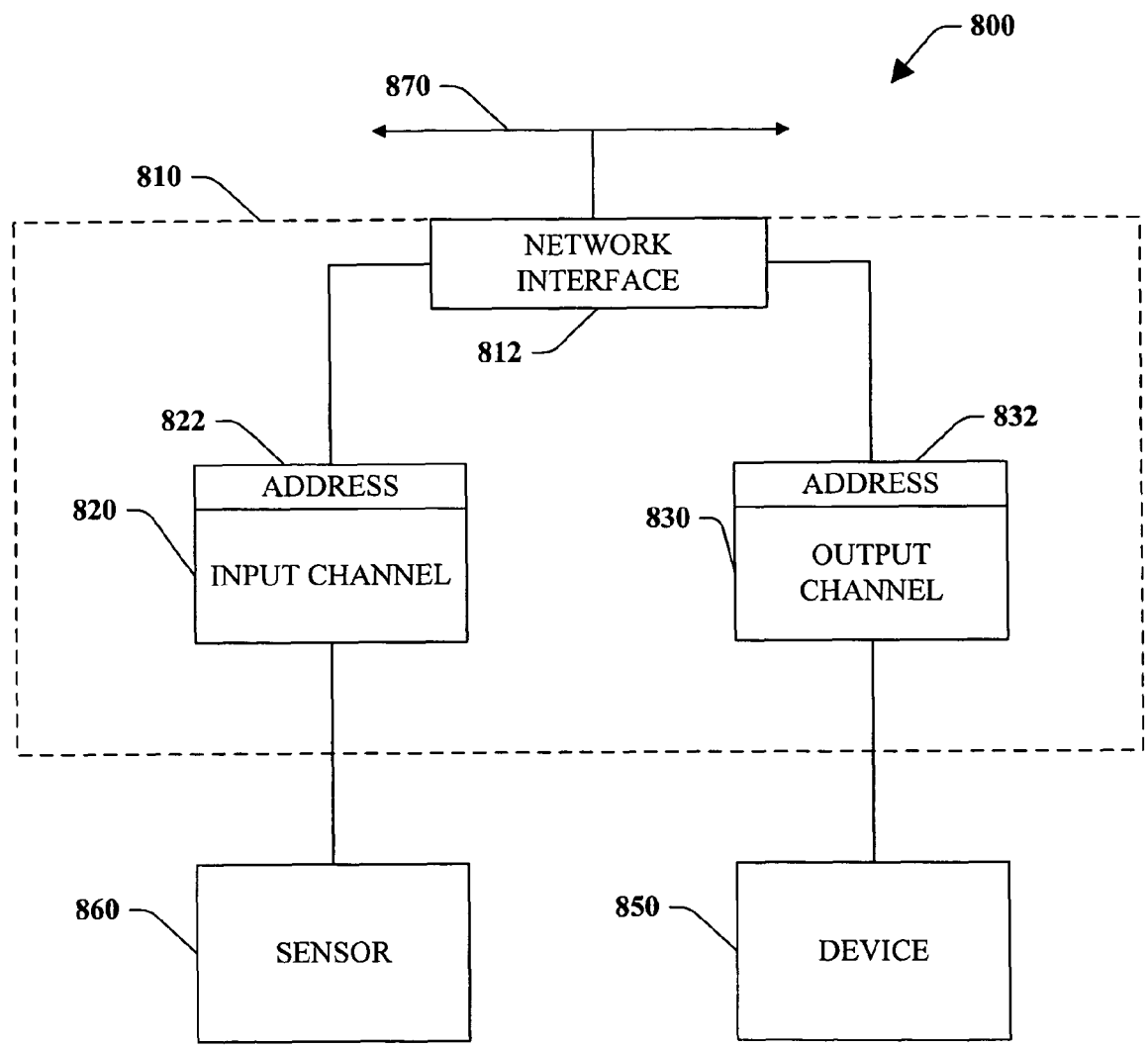
FIG. 8 is a block diagram illustrating an industrial control device system in accordance with an aspect of the subject invention.

Turning briefly to FIG. 8, an exemplary I/O module system 800 is shown that is similar to control devices 730, 740, and 750 from FIG. 7. I/O module system 800 includes an I/O module 810 communicatively coupled to a network 870 via a network interface component 812. The I/O module 810 has an input channel component 820 and an output channel component 830. Input channel 820 receives input data from a sensor 860 and output channel 830 transmits output data to a control device 850. Control device 850, for example, can be a motor, a valve, an application, a display, a HMI, a PLC or other similar industrial control devices. Input channel 820 and output channel 830 are assigned addresses 822 and 832 respectively that are operable on network 870. Addresses 822 and 832 can be assigned so that information indicative of the type and function of the addressed devices is conveyed. For example, an address or a portion thereof can express whether the addressed device is an I/O module, a program module, a sensor, a HMI or some other device. The addresses 822 and 832 may be, for example, IPv6 addresses to provide globally unique identification of input channel 820 and output channel 830. IPv6 addresses are 128 bits in length thus allowing addresses to be unique worldwide and numerous addresses to be assigned to a particular device for self-assigned, site local, and other network scoped addressable mechanisms.

Returning to FIG. 7, the devices 730, 740, and 750 utilized multiple addresses 732, 742, and 752 in the manner depicted in FIG. 8. The addresses 732, 742, and 752 are individually assigned to the included components, services, or objects provided by the devices 730, 740 and 750. In accordance with a particular aspect of the subject invention, device objects such as CIP objects and the like can be assigned discoverable object identifiers (OIDs) (e.g., public prefix appended with identification numbers). As the devices are added to the network, they can become visible to other systems also operating on the network. The directory component 710 discovers the devices as they are attached using a discovery protocol (e.g., Cisco Discovery Protocol, IPv6 Neighbor Discovery Protocol . . . ). Additionally or alternatively, the devices or nodes can announce there presence to directory component 710. The addresses 732, 742 and 752 are of the type described in conjunction with FIG. 8 and are indicative of the category and/or type of the device or services provided thereby. The directory component 710 processes the discovered or announced address and determines the device category and the type of service provided by that device at that particular discovered address. A data store 712 is associated with directory 710 wherein the directory 710 stores information regarding the discovered devices and the services objects and the like provided there with. Directory 710 is communicatively coupled to a second network 760 whereby clients (not shown) on the second network can request a list of discovered devices and services. The directory 710, upon such a request from a client, replicates the contents of the data store 712 and transmits the contents to the client via the second network 760. Directory 710 can also function as a gateway device providing a network route from clients on the second network 760 to the devices 730, 740 and 750. It is to be appreciated that this gateway function may also include translating network requests from an IPv6 network used by the devices to an IPv4 network commonly used in many networks and the Internet.

Figure 9:
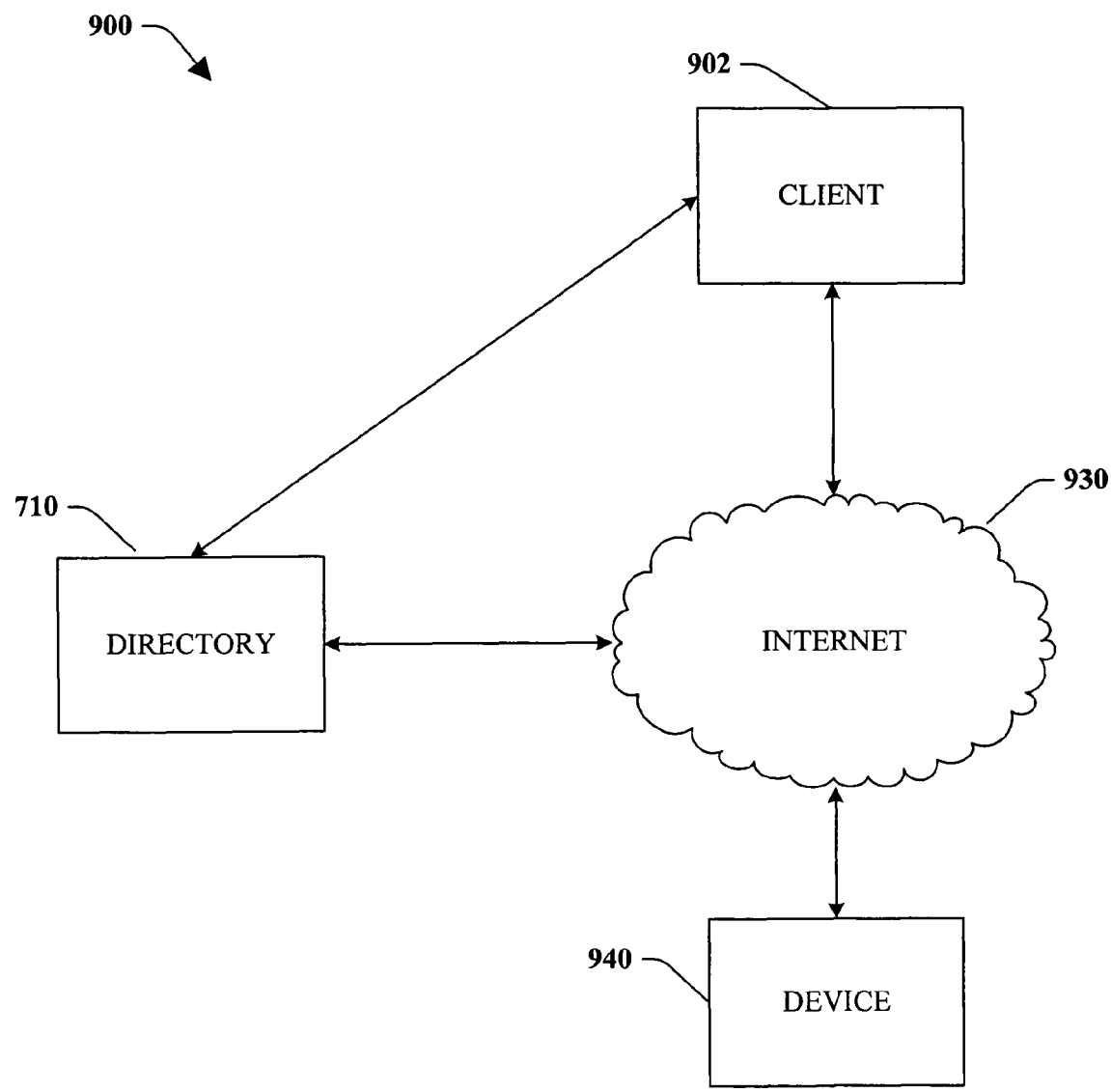
FIG. 9 is a block diagram of an industrial control system in accordance with an aspect of the subject invention.

FIG. 9 depicts a discovery system 900. The system 900 includes a client 902, a directory 710, and a device 940 that communicates via the Internet 930 or other network. The device 940 can be provided with or generate a globally unique address such that client 902 can access device 940 from anywhere on the Internet. Client component 902 can be a computer, processor based device, automation device or other electronic device that can communicate over Internet 930. The directory can be a computer readable medium or computer program product that stores address associated with devices 940, among others. The client component 902 can access the directory 710 via a LAN or the Internet to acquire the globally accessible address of device 940. After acquisition, client 902 is capable of communicating with device 940 over the Internet. It is to be appreciated that the globally unique address allows for clients to connect with the device from a LAN in the same fashion.

Figure 10:
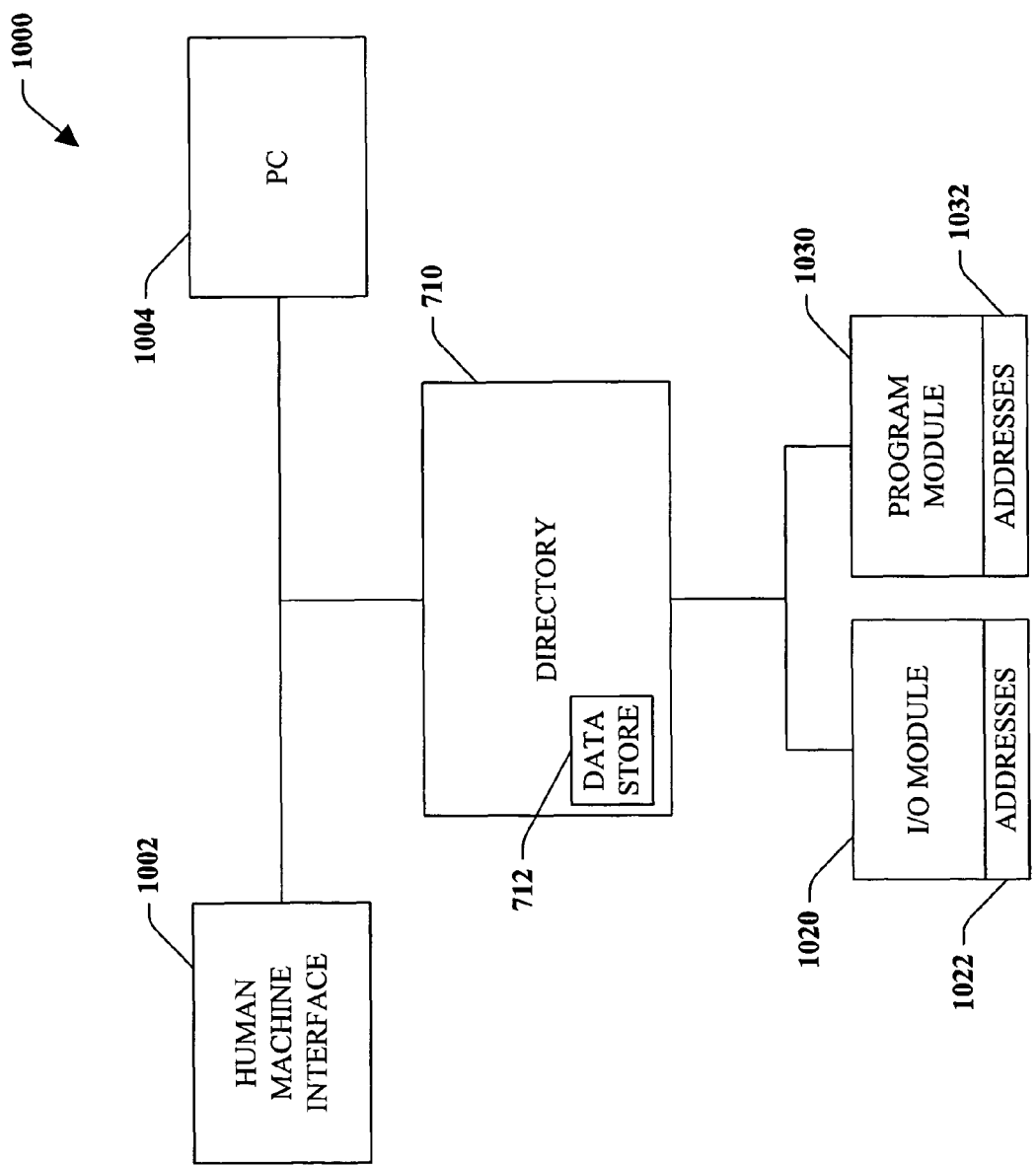
FIG. 10 is a block diagram illustrating a discovery system in accordance with an aspect of the subject invention.

FIG. 10 is a system diagram illustrating an exemplary discovery system 1000 depicting aspects of the subject invention. System 1000 includes a human machine interface component 1002, a personal computer (PC) 1004, a directory component 710, as well as a program module 1030 and I/O module 1020. Program module 1030 and I/O module 1020 can include or be associated with one or more network addresses 1032 and 1022, respectively. Such addresses can be but are not limited to being Internet protocol addresses (IP addresses). Further, addresses 1022 and 1032 can be descriptive of the modules and/or services provide thereby with which they are associated. Directory component 710 can monitor modules connected to a network and discover their addresses. Once discovered, directory component 710 can persist the addresses and optionally information concerning the modules associated there with to data store 712. Human machine interface (HMI) 1002 and personal computer (PC) 1004 can interact with directory component. Directory component 710, upon request, can present contact information for network devices to either or both of HMI 1002 and PC 1004. For example, an IP addresses and the names of the devices can be provide to for display. Additionally, device objects, services and the like can be identified by identification numbers (e.g. OID) that classify and identify individual objects services and the like. Such information can be presented hierarchically or in any other easily comprehensible format. From this information, users of either or both of HMI 1002 and PC 1004 can identify a device they would to query and employ its address to facilitate identification and communication with more or more modules across one or more networks and/or interact directly with an identified object, service, or the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components and/or sub-components may be combined into a single component providing aggregate functionality. For instance, security component 116 could be incorporated within network module 114 or be communicative coupled thereto. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For example, directory component 710 can employ artificial intelligent based components or systems to facilitate discovery and presentation of PLC modules and there addresses when they are connected to a network. In addition, security component 116 can employ one or more of the aforementioned components, mechanism, and the like to restrict or control access.

In view of the exemplary systems described supra, methodologies that may be implemented in accordance with the disclosed subject matter will be better appreciated with reference to the flow charts of FIGS. 11-16. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 11:
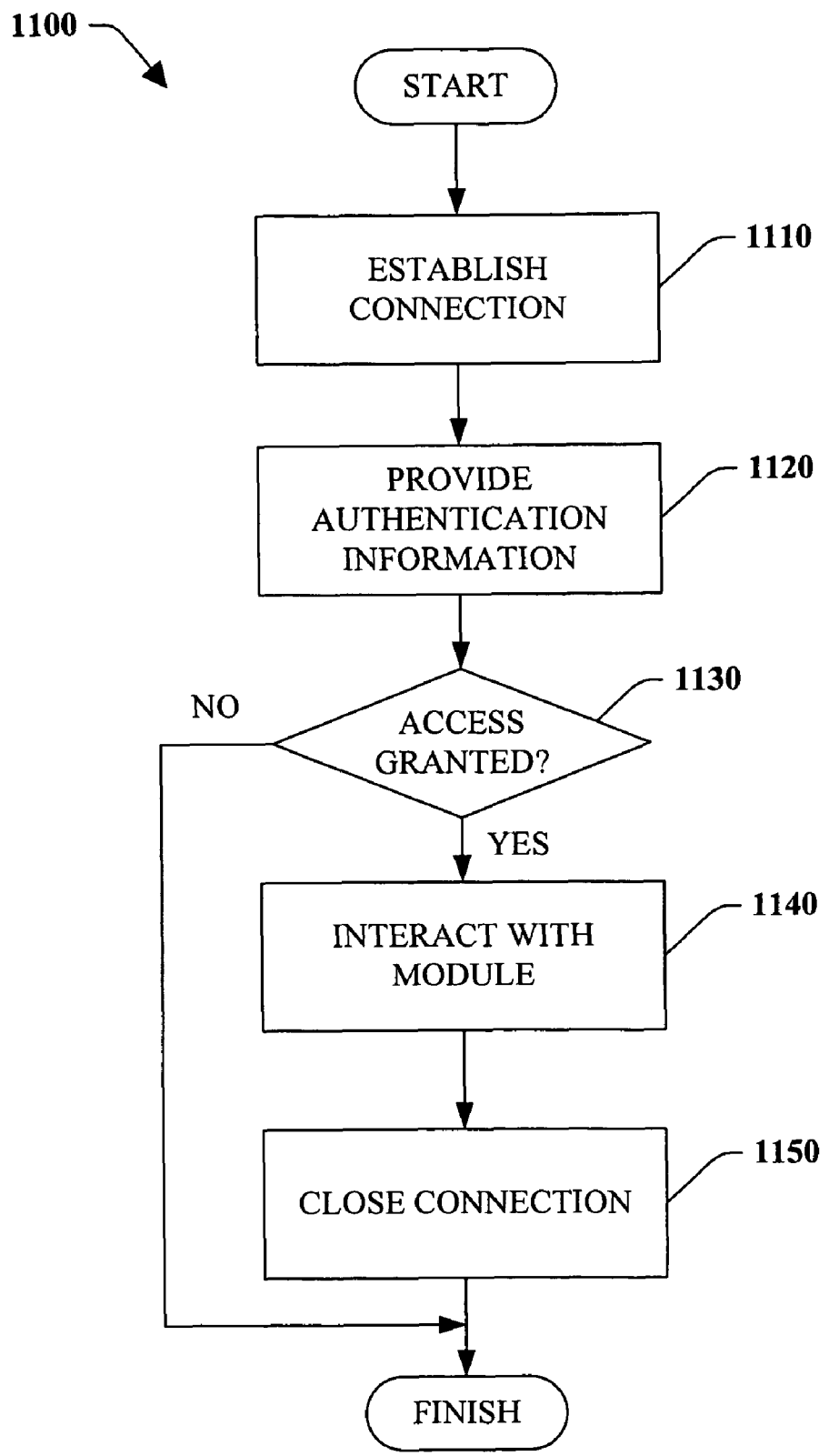
FIG. 11 is a flow diagram of an industrial control system communication methodology.

Turning now to FIG. 11, a flow diagram illustrates a communication methodology 1100 in accordance with one aspect of the subject invention. Method 1100 can be employed in a scenario wherein a client interfaces with a PLC module via a network, but is not limited to such a situation. At reference numeral 1110, a communication connection is established. For instance, an address can be located an communication initiated with a device or component associated with that address. By way of example and not limitation, a client (e.g., PC, HMI, automation device . . . ) can establish communication with a PLC module by accessing the address of the PLC module on a network and starting a communication session. At 1120, authentication information can be provided to identify a user or entity. At 1130, a determination is made as to whether access is granted. For example, a security component can authenticate the privileges of the client. This may be accomplished by a variety of methods, including but not limited to, validating a username and password, mapping the credentials or security access request to an enterprise common single sign on mechanism, or verifying the client address is one of an allowed address. If at 1130 access is granted then the method proceeds to 1140. At 1140, interaction is had with a control module or device. For instance, data can be transmitted to and/or retrieved from a controller module. In effect, an authenticated client may be allowed to access a PLC module and transmit control requests through a security component. The authentication remains active and the interaction can continue throughout a session until closing the connection between the client and PLC module at 1150 ends the session. If at 1130, access is not granted the method can simply terminate.

Figure 12:
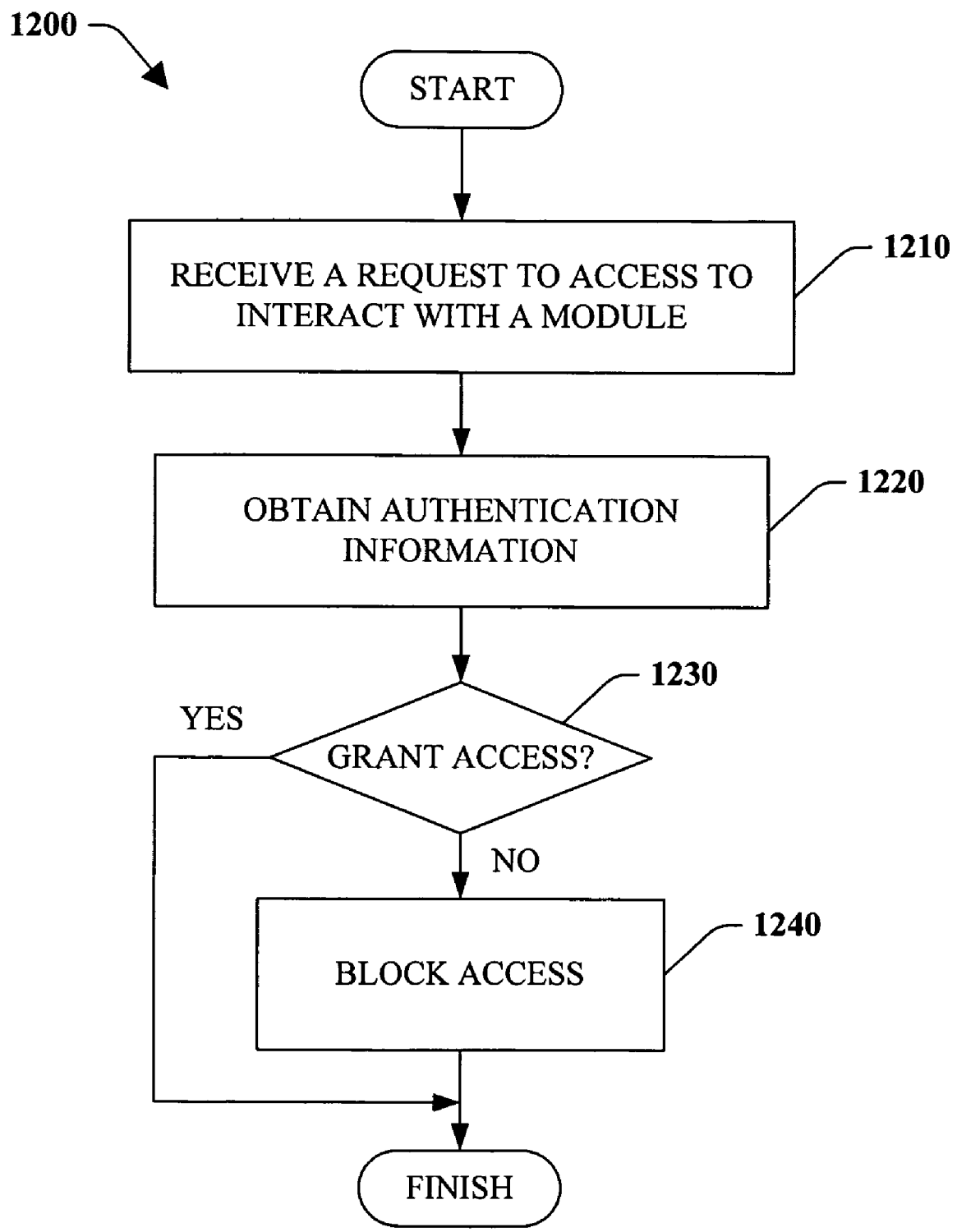
FIG. 12 is a flow diagram of a method for controlling access to control modules or devices.

FIG. 12 is a flow chart diagram of a method 1200 of controlling access to control modules or devices. At reference numeral 1210, a request to access a control module or device is received. By way of example and not limitation such request could originate with from a personal computer, human machine interface, or even another automation device or system. At 1220, authentication or security information is obtained. Such information can be obtained from the received request such as an originating address. Additionally or alternatively, the requesting entity may be polled for security information such as a username or password and/or use a digitally signed certificate or the like. At 1230, a determination is made as to whether the requesting entity should be granted access to a control module or device. For instance, the originating address can be checked against record of allowable address and/or a username and password verified. If at 1230 access is not granted then the method continues at 1240. Access can be blocked at 1240. Alternatively, if at 1230 access is granted the method can simply terminate thereby allowing the requesting entity to interact with an automation device or module. Of course, the reverse may be performed such that access is always actively blocked and upon granting access actions can be performed to enable a requesting entity to interact with a particular module or device. Further, messages in and out can be mapped and/or translated to facilitate communication.

Figure 13:
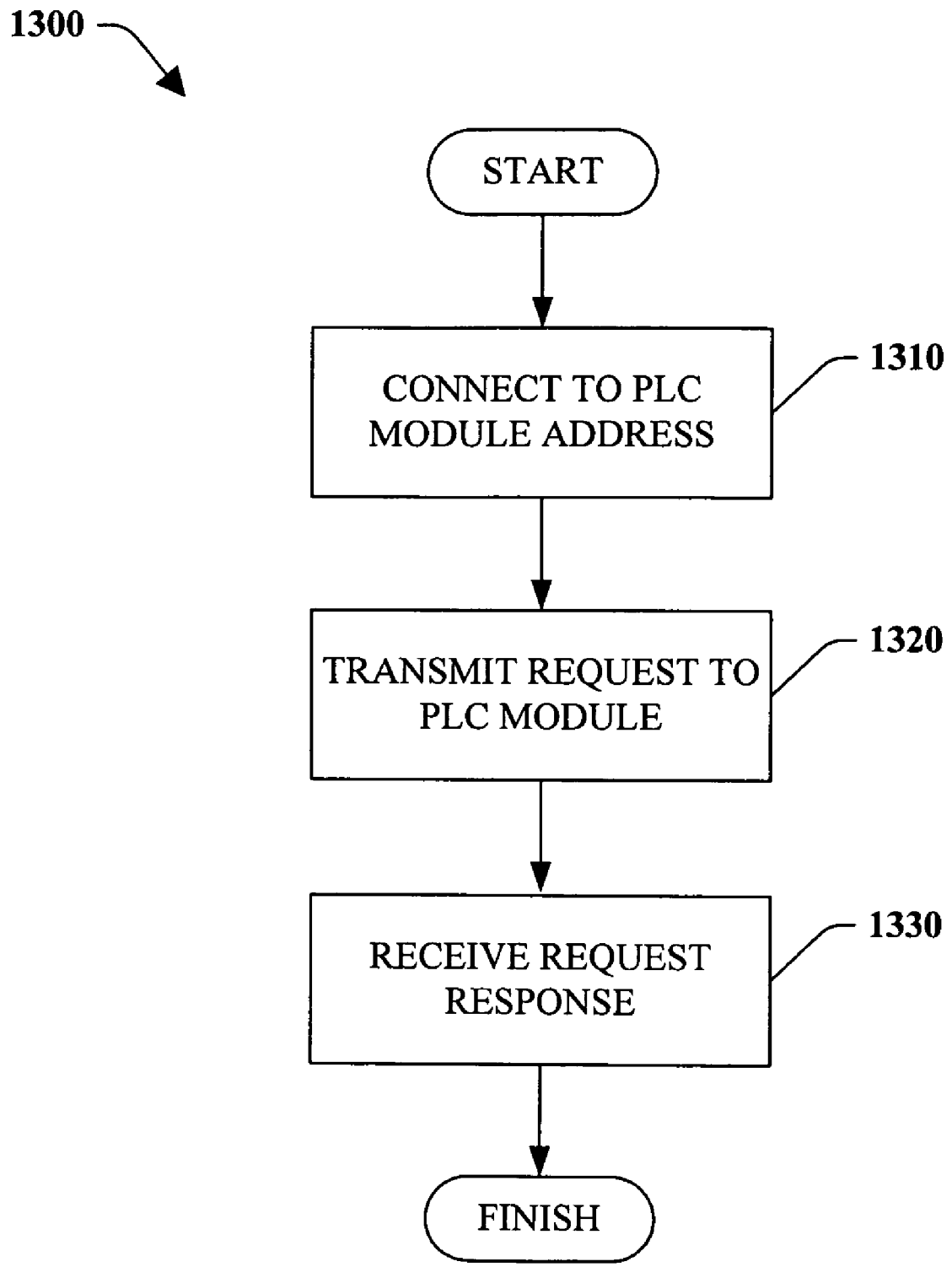
FIG. 13 is a flow diagram of a programmable logic controller communication methodology.

Referring now to FIG. 13, a flow diagram 1300 illustrates a programmable logic controller communication methodology according to another aspect of the subject invention. At 1310, a client initiates communication by attempting to connect to the network address assigned to a PLC module. The PLC module is associated with a PLC and coupled to the backplane of the PLC. At 1320, the client transmits a request to the PLC module via the network. For example, a TCP/IP suite request could be made such as employing a file transfer protocol (FTP) or hyper text transfer protocol (HTTP) to request a file or other data. A response to the request can be received at 1330. For instance, an addressed PLC module can transmit the response over the backplane to the network module, which if necessary can translate the response from the backplane protocol to a network protocol such as TCP/IP.

Figure 14:
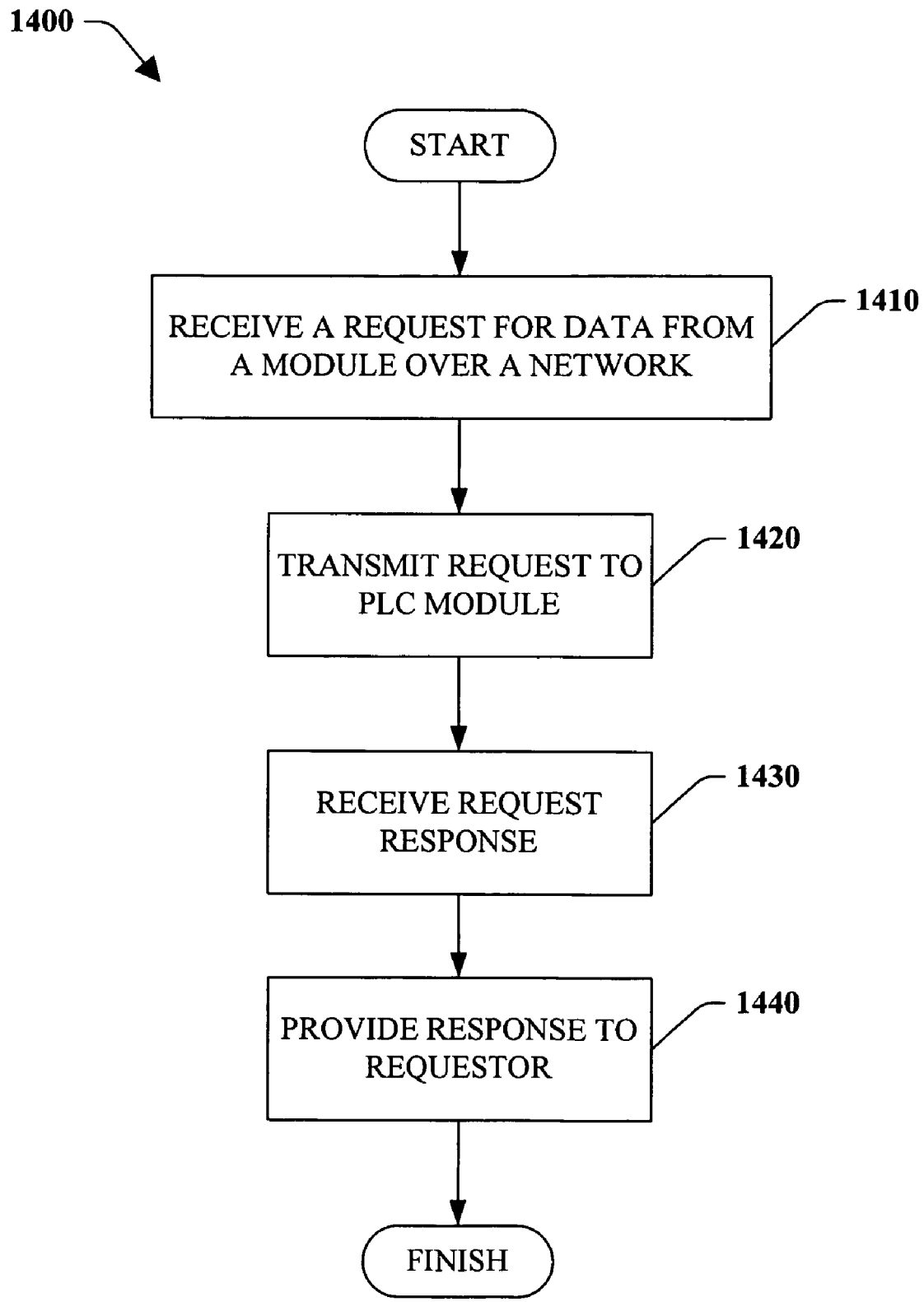
FIG. 14 is a flow diagram of a method for processing requests for data from a PLC module.

FIG. 14 depicts a methodology 1400 for processing requests for data from a PLC module. At reference numeral 1410 a request is received for data from a module. This request can be provided over a network via a TCP/IP or other standard protocol. In accordance with an aspect of the invention, a network module can receive the request for modules of a PLC unit. A network module can also be coupled to the backplane of the PLC as well as communicatively coupled to a network. At 1420, the request can be transmitted to the addressed PLC module. For example, a network module can, if necessary, translate the network request to a request in accordance with the protocol utilized for backplane communication. The backplane protocol can include, but is not limited to, industrial protocol (IP), Internet protocol (IP), and transparent interprocess communication protocol (TIPC). The translated request can subsequently be routed over the backplane to the PLC module. At 1430 the request response can be retrieved or received from the PLC module. At 1440, the response can be provided to the requestor. For example, such information can be transmitted over the backplane to a network module and then back to the requestor over a network.

Figure 15:
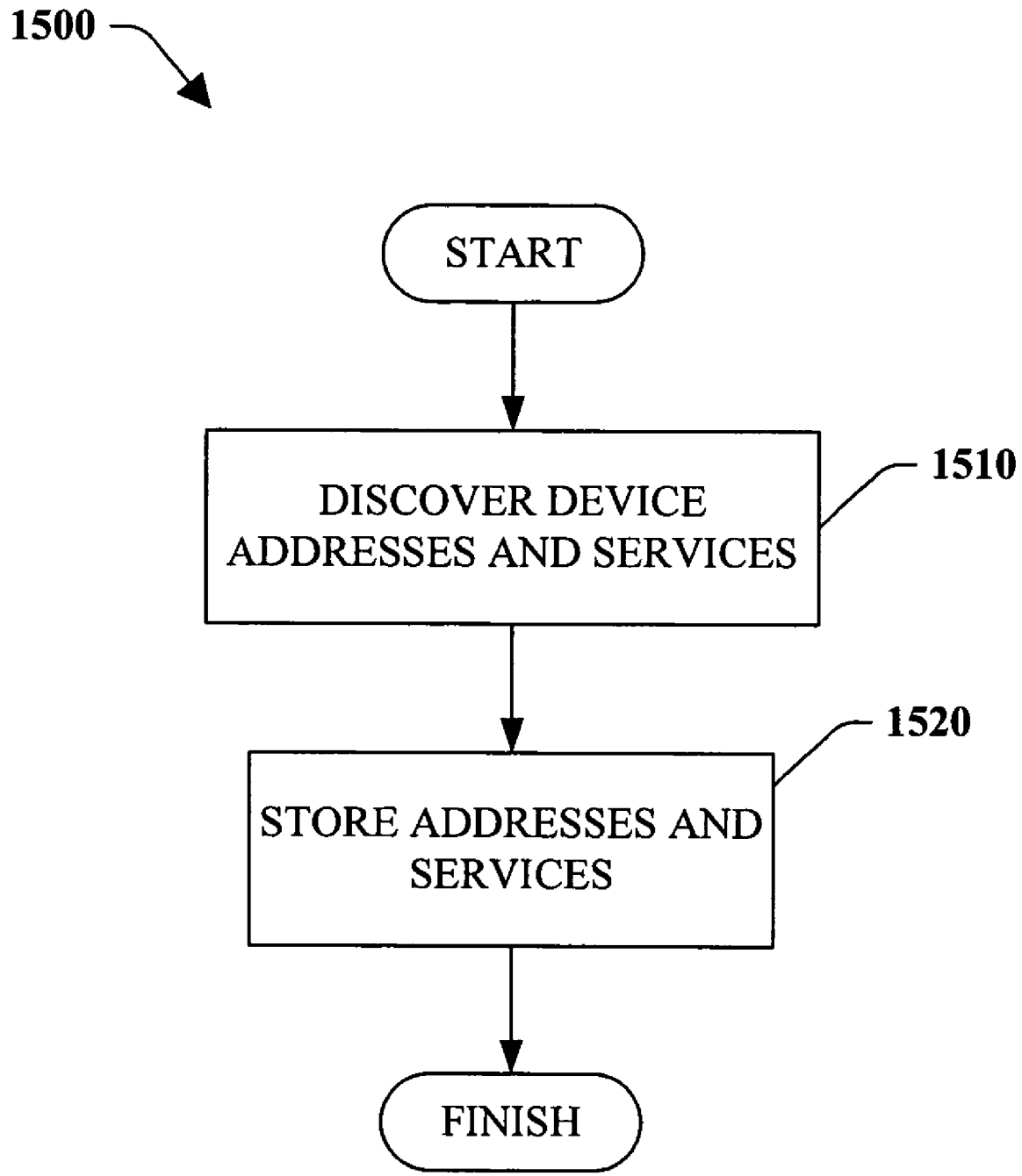
FIG. 15 is a flow diagram of a device discovery methodology.

Turning now to FIG. 15, flow diagram 1500 illustrates a device discovery methodology in accordance with an aspect of the subject invention. At 1510, an automation device is discovered. For example, a device such as a PLC module can newly connected to an industrial automation system network. The device can have a network address assigned for each service provided by that device, where the type of device or service is conveyed by at least a portion of the network address. A discovery protocol or service can be employed to detect the arrival of the new device. At 1530, information about discovered devices can be stored to facilitate subsequent interaction such as lookup. For instance, a directory service can processes the addresses of the newly discovered devices to discern the device type or service type conveyed by the addresses. Each address and associated device type or service type is stored in a data store.

Figure 16:
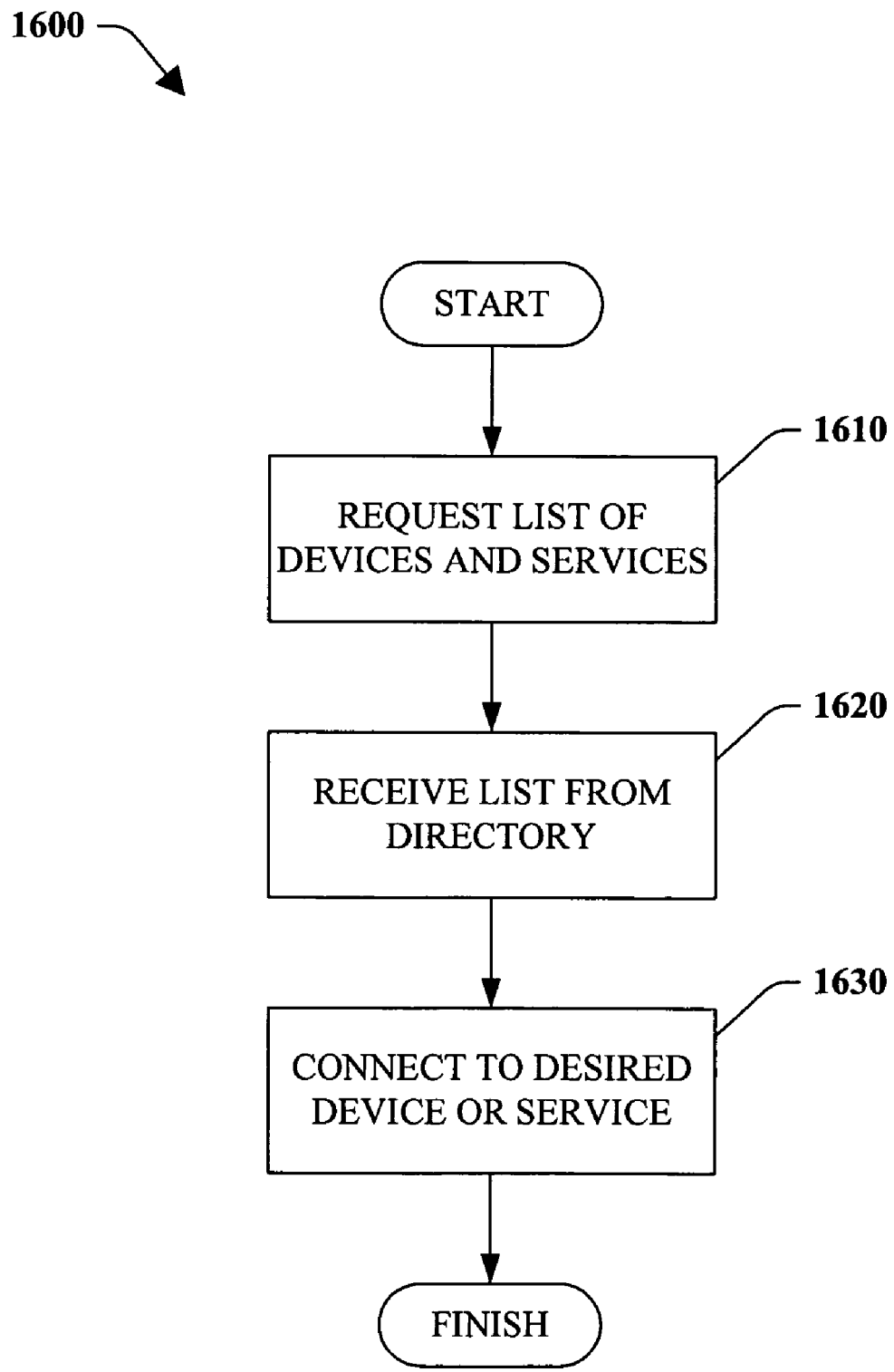
FIG. 16 is a flow diagram of a methodology for propagating discovered devices.

FIG. 16 depicts a methodology 1600 for propagating discovered device data according to an aspect of the subject invention. At 1610, a list of devices and optionally associated services is requested. For instance, a client (e.g. PC or HMI) can initiates communications with a directory and requests a list of devices and services with associated network addresses. At 1620, a list of devices and optionally associated services is received. For example, a list of devices and associated IP addresses can be provided in an easily comprehensible manner such as via a hierarchy or pictorial representation of a system in which devices reside or in an XML document. At 1630, received information can be employed to communicate with a particular device(s). By way of example, a client may choose a device or service that is desired and initiates communication with the desired device or service by attempting to connect to the network address associated with that device or service.

Figure 17:
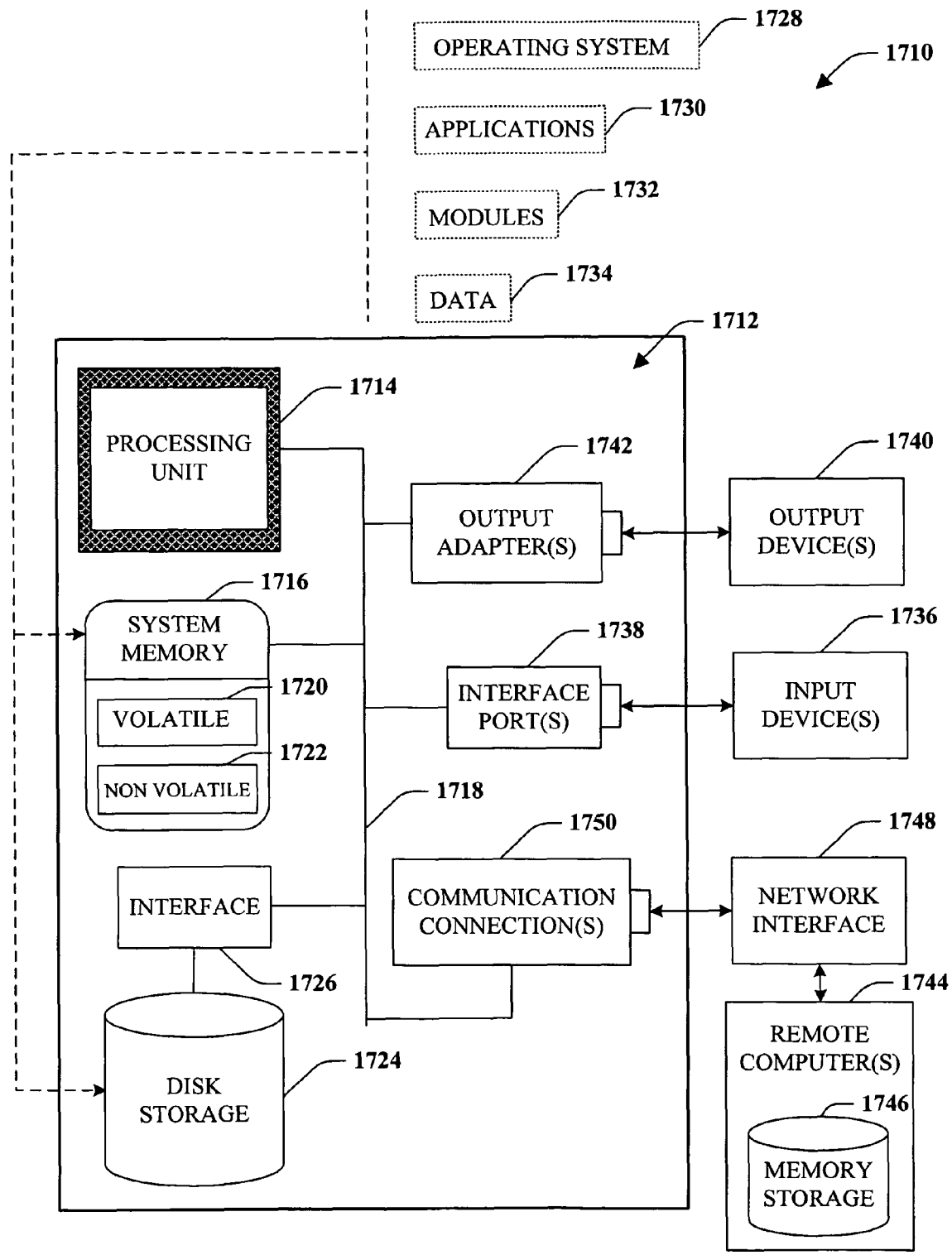
FIG. 17 is a schematic block diagram of a sample-computing environment.

In order to provide a context for the various aspects of the disclosed subject matter, FIG. 17 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on standalone computers. In a distributed computing environment, program modules may be located in both local and remote memory storage devices.

With reference to FIG. 17, an exemplary environment 1710 for implementing various aspects disclosed herein includes a computer 1712 (e.g., desktop, laptop, server, hand held, programmable consumer or industrial electronics . . . ). The computer 1712 includes a processing unit 1714, a system memory 1716, and a system bus 1718. The system bus 1718 couples system components including, but not limited to, the system memory 1716 to the processing unit 1714. The processing unit 1714 can be any of various available microprocessors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 11 illustrates, for example, disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the present invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712 and to output information from computer 1712 to an output device 1740. Output adapter 1742 is provided to illustrate that there are some output devices 1740 like displays (e.g., flat panel and CRT), speakers, and printers, among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1144.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection(s) 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems, power modems and DSL modems, ISDN adapters, and Ethernet cards or components.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. An industrial control system comprising:
    a network module component communicatively coupled to an industrial device the network module component further communicates to an internet, the industrial device has a globally unique network address that is self-assigned by the industrial device based upon at least one of a type or function of the industrial device, wherein at least a portion of the globally unique network address provides an indication of the at least one of a type or function of the industrial device; and
    a security component that controls access to the industrial device through the network module.

2. The system of claim 1, further comprising a directory component that discovers the globally unique network address and makes the globally unique network address available on the internet.

3. The system of claim 1, the security component authenticates access privileges of a client.

4. The system of claim 3, the security component blocks network traffic from an unauthorized client.

5. The system of claim 1, the security component prevents access from clients outside a local area.

6. The system of claim 1, the security component utilizes at least one of firewall techniques, network address translation techniques, and filtering techniques to hide at least one of the globally unique identifiers from view over the Internet.

7. The system of claim 1, the security component is embedded within the network module or embedded within the industrial device.

8. A method of network access in an industrial controller environment comprising:
    communicating with at least one industrial control device over a backplane, wherein the industrial control device has a globally unique identifier that is self-assigned by the industrial control device based upon at least one of a type or function of the industrial control device, wherein at least a portion of the globally unique network address provides an indication of the at least one of a type or function of the industrial control device;

communicating with a remote system via a TCP/IP network using the globally unique network identifier; and authenticating communications between the remote system and the services on the industrial control device based upon the globally unique identifier.

9. The method of claim 8, authenticating communications further comprises validating a username and password.

10. The method of claim 9, further comprising verifying privileges of the remote system.

11. A computer readable medium having stored thereon computer executable instructions for carrying out the method of claim 8.

12. An industrial control system comprising:

an industrial control device communicatively coupled to a backplane, wherein the industrial control device comprises a globally unique internet address that is self-assigned by the industrial control device based upon at least one of a type or function of the industrial control device, wherein at least a portion of the globally unique internet address provides an indication of the at least one of a type or function of the industrial control device; and a network interface component communicatively coupled to the backplane, wherein the network interface communicates to the internet, the network interface routes message over the backplane from the internet to the industrial control device and from the industrial control device to the internet based upon the globally unique internet address.

13. The system of claim 1, wherein the industrial device comprises a plurality of services, wherein each service has a globally unique network address on the internet, the network module component routes messages from the internet to the industrial device and from the industrial device to the internet based upon the globally unique network addresses of each service.

* * * * *